United States Patent [19]

Matsunaga et al.

[11] Patent Number: 5,013,480
[45] Date of Patent: May 7, 1991

[54] PHOSPHOR FOR CATHODE RAY TUBE

[75] Inventors: Kazu Matsunaga, Amagasaki; Hiroshi Okuda, Nagaokakyo; Kenzo Awazu, deceased, late of Nishinomiya, all of Japan, by Setsuko Awazu, legal representative

[73] Assignee: Mitsubishi Denki Kabushiki Kaisha, Tokyo, Japan

[21] Appl. No.: 867,854

[22] Filed: May 21, 1986

[30] Foreign Application Priority Data

May 21, 1985 [JP] Japan .................. 60-109801

[51] Int. Cl.⁵ .................. C09K 11/78; C09K 11/86
[52] U.S. Cl. .................. 252/301.4 H; 252/301.4 R
[58] Field of Search .................. 252/301.4 R, 301.4 H

[56] References Cited

U.S. PATENT DOCUMENTS

| | | | |
|---|---|---|---|
| 3,243,625 | 3/1966 | Levine et al. | |
| 3,368,980 | 2/1968 | Avella et al. | 252/301.4 R |
| 3,457,184 | 7/1969 | Kobayashi et al. | 252/301.4 R |
| 4,141,855 | 2/1979 | Tomiki et al. | 252/301.4 R |
| 4,191,662 | 3/1980 | Mathers et al. | 252/301.4 R |

*Primary Examiner*—Jack Cooper
*Attorney, Agent, or Firm*—Oblon, Spivak, McClelland, Maier & Neustadt

[57] ABSTRACT

A phosphor for a chathode ray tube obtained by firing a tervalent europium-activated yttrium oxide of the formula $Y_2O_3$:Eu containing at least one member selected from the group consisting of barium fluoride and magnesium fluoride.

1 Claim, 2 Drawing Sheets

PHOSPHOR FOR CATHODE RAY TUBE

BACKGROUND OF THE INVENTION

1. Field of the Invention

The present invention relates to a phosphor for a cathode ray tube. More particularly, the present invention relates to a phosphor for a cathode ray tube having excellent luminance brightness, chromaticity and proper afterglow.

2. Description of the Prior Art

Recently, a cathode ray tube for display indication is frequently employed for the control or monitoring of a terminal equipment of a computer or a plant system. In such a case, the display indication is a numeral, alphabet, katakana i.e. the square Japanese syllabary or figure. For this purpose, a color cathode ray tube is advantageous because it functionally has a great capacity for informations and the display indication can readily be read. However, a usual cathode ray tube is designed to display mainly continuously moving pictures, and therefore, it is desired that afterglows of the respective phosphors emitting different colors are short enough so that they are invisible. Whereas, the above-mentioned cathode ray tube for display indication is primarily intended to display letters, characters or figures which are still for a certain period of time. Accordingly, by employing a phosphor showing suitable afterglows, it is possible to reduce the flickering of the image so that the image can clearly be seen, and it is also possible to reduce the number of picture elements to be transmitted. This gives an observer less eye strain, and chances of misreading will be reduced. Further, the circuit can advantageously be simplified.

As a representative phosphor currently employed for such a purpose, there may be mentioned a green emitting $Zn_2 SiO_4$:Mn,As phosphor or a red emitting $(Zn,Mg)_3(PO_4)_2$:Mn phosphor. The former has $B_{10\%}$ (reduction time of luminance brightness to 10% after stopping of excitation) of 150 msec. and the latter has $B_{10\%}$ of 120 msec. Thus, they have satisfactory afterglow characteristics.

However, the above-mentioned conventional long-afterglow phosphors generally show somewhat poor emission efficiency. Particularly, as the spectral luminous efficacy of the red phosphor is low, its luminance brightness is insufficient as compared with the green phosphor. In order to supplement the want of luminance brightness, a short afterglow-red phosphor having high luminance brightness used for a color cathode ray tube for a television, for instance, $Y_2O_2S$:Eu, is incorporated (Japanese Patent No. 917125). However, as its afterglow is as short as $B_{10\%} = 2$ msec., there is a problem that the amount of incorporation is limited.

SUMMARY OF THE INVENTION

The present invention has been made to solve such a problem. It is an object of the present invention to obtain a phosphor for a cathode ray tube endowed with long afterglow while maintaining the high emission efficiency.

The present invention provides a phosphor for a cathode ray tube obtained by firing a tervalent europium-activated yttrium oxide of the formula $Y_2O_3$:Eu containing at least one member selected from the group consisting of barium fluoride and magnesium fluoride.

Figure 1:
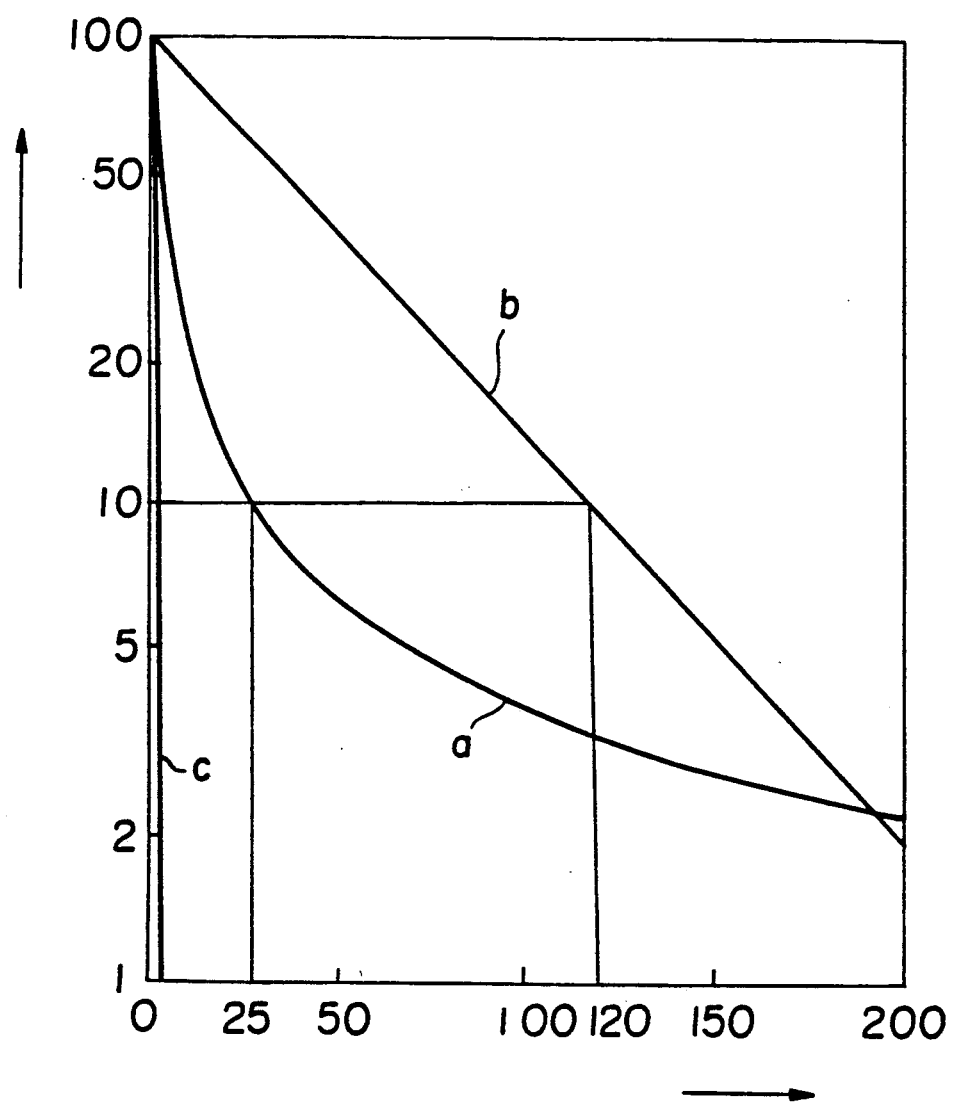
FIG. 1 is a graph showing the attenuation characteristics of the afterglows of the phosphors of the Examples of the present invention and of conventional phosphors $(Zn,Mg)_3(PO_4)_2$:Mn and $Y_2O_3$:Eu, wherein the attenuation of the afterglow of each phosphor is represented by the relative luminance brightness of the afterglow based on the emission luminance brightness of the phosphor under excitation being evaluated to be 100.

The curve (a) shows the attenuation characteristics of the phosphors of the present invention and the straight line (b) shows the attenuation characteristics of the conventional phosphor $(Zn,Mg)_3(PO_4)_2$:Mn and the straight line (c) shows the attenuation characteristics of the conventional phosphor $Y_2O_3$:Eu.

DETAILED DESCRIPTION OF THE PREFERRED EMBODIMENTS

Factors relating to excitation, emission and afterglow of the phosphors are influenced by the luminescent centers and the circumference of crystalline field in which the luminescent centers are located. It is considered that $BaF_2$ and $MgF_2$ in the phosphor of the present invention substitute $Ba^{2+}$ or $Mg^{2+}$ for a part of $Y^{3+}$ of the matrix $Y_2O_3$ crystal and $F^-$ for a part of $O^{2-}$. The cause for the afterglows is considered to be that the ionic radius of $Ba^{2+}$ (1.34 A) or $Mg^{2+}$ (0.66 A) is substantially different from the ionic radius of $Y^{3+}$ (0.893 A), although it may be attributable also to the difference in the electric charge. This can be inferred from the fact that a fluoride of Ca or Sr having an ionic radius closer to that of $Y^{3+}$, i.e. $Ca^{2+}$ (0.99 A) or $Sr^{2+}$ (1.12 A), does not provide an afterglow which can adequately be observed with naked eyes as in the case of $BaF_2$ or $MgF_2$ despite Ca and Sr and homologues of Ba and Mg, although a slight afterglow may be observed Now, the present invention will be described in detail with reference to Examples. However, it should be understood that the present invention is by no means restricted by these specific Examples.

EXAMPLE 1

45.16 g (0.2 mol) of yttrium oxide and 2.82 g (0.008 mol) of europium oxide were added to 400 ml of pure water, and 80 ml of nitric acid (specific gravity: 1.42, concentration: 70%) was added thereto. The mixture was heated and stirred. Separately, 84 g of oxalic acid was dissolved in 1.5 of pure water under heating. The two solutions were mixed and stirred at a liquid temperature of from 85 to 95° C. The stirring was continued for 30 minutes, and then precipitates were collected by filtration washed with pure water and then dried at 100° C. 250 mg of barium fluoride and 40 ml of ethanol were added to 50 g of the coprecepitated oxalates of yttrium and europium, and the mixture thus obtained was mixed in a mortar and dried. The dried mixture was charged into a crucible made of alumina, and fired in an air atmosphere at 1400° C for one hour by an electric furnace. The substance thus obtained emitted a clear red light under cathode ray excitation, and the afterglow was clearly observed with naked eyes. According to the results of the experiment, the luminance brightness (emission luminance brightness) of the phosphor of this Example under the cathode ray excitation was 301 relative to the emission luminance brightness of a conventional long afterglow-red phosphor $(Zn,Mg)_3(PO_4)_2$:Mn being evaluated to be 100, and $B_{10\%}$ was 25 msec. It took 120 msec. for the luminance brightness of the phosphor of this Example to drop to the same level as $B_{10\%}$ in the luminance brightness of the above-mentioned $(Zn,Mg)_3(PO_4)_2$:Mn.

EXAMPLE 2

600 mg of magnesium fluoride and 40 ml of ethanol were added to 50 g of coprecipitated oxalates of yttrium and europium obtained in the same manner as in Example 1, and the mixture thus obtained was mixed in a mortar and dried. The dried mixture was charged into a crucible made of alumina and fired in an air atmosphere at 1350° C. for one hour by electric furnace. According to the results of the experiment, the emission luminance brightness of the phosphor thus obtained was 298 relative to the emission luminance brightness of the above-mentioned $(Zn,Mg)_3(PO_4)_2$:Mn being evaluated to be 100, and $B_{10\%}$ was 25 msec. Thus, the same emission properties as in Example 1 were obtained.

EXAMPLE 3

22.58 g (0.1 mol) of yttrium oxide, 1.41 g (0.004 mol) of europium oxide and 250 mg of $BaF_2$ were weighed, and they were charged into a ball mill pot, and pulverized and mixed. The mixed powder was charged into a crucible made of alumina and fired in an air atmosphere at 1400° C. for one hour by electric furnace. According to the results of the experiment, the emission luminance brightness of the phosphor thus obtained was 300 relative to the emission luminance brightness of the above-mentioned $(Zn,Mg)_3(PO_4)_2$:Mn 100, and $B_{10\%}$ was 25 msec. Thus, the same emission properties as in Example 1 were obtained.

EXAMPLE 4

22.58 g (0.1 mol) of yttrium oxide, 1.41 g (0.004 mol) of europium oxide and 725 mg of $MgF_2$ were weighed, and they were charged into a ball mill pot, and pulverized and mixed. The mixed powder was charged into a crucible made of alumina and fired in an air atmosphere at 1350° C. for one hour by electric furnace. According to the results of the experiment, the emission luminance brightness of the phosphor thus obtained was 298 relative to the emission luminance brightness of the above-mentioned $(Zn,Mg)_3(PO_4)_2$:Mn being evaluated to be 100, and $B_{10\%}$ was 25 msec. Thus, the same emission properties as in Example 1 were obtained.

The phosphors obtained in the above-mentioned Examples were subjected to X-ray diffraction to examine changes in their crystal lattices. And no substantial difference was observed as compared with $Y_2O_3$:Eu containing neither barium fluoride nor magnesium fluoride.

The amounts of barium fluoride and magnesium fluoride to be incorporated in phosphors are shown Table 1. The lower limit is the undesirable amount by reason that an afterglow becomes as weak as at most about 15 msec. of B10%, whereby the reduction of flickering is hardly determined. The upper limit is the undesirable amount by reason that if barium fluoride or magnesium fluoride is further incorporated, the emission luminance brightness of the phosphor becomes as low as at most about 80% of the mission luminance brightness of the above-mentioned short afterglow-red phosphor $Y_2O_3$:Eu and an afterglow becomes too weak like in a lower limit. The amount is shown by % by weight of barium fluoride or magnesium fluoride relative to the phosphor.

TABLE 1

|  | Lower limit (% by weight) | Upper limit (% by weight) |
|---|---|---|
| Amount of barium fluoride relative to the phosphor | 0.8 | 2.0 |
| Amount of magnesium fluoride relative to the phosphor | 2.0 | 5.0 |

The temperature and time for firing are not critical. However, if the temperature is 1200° C. or lower, no adequate solid phase reaction of barium fluoride or magnesium fluoride is obtained so that the characteristics of the phosphors in both emission luminance brightness and afterglow will be poor. On the other hand, if the temperature is 1450° C. or higher, the crystal growth will be too much, and sintering will result partially in the phosphor. Accordingly, the preferred temperature range is from 1300 to 1400° C. The firing time should be controlled depending upon the firing amount. The same emission properties as in the above-mentioned Examples were obtained also in the case where both barium fluoride and magnesium fluoride were incorported. The characteristics of the phosphor obtained as above were measured as applied to a cathode ray tube. The results are shown in Table 2.

TABLE 2

|  | Relative value of luminance brightness (%) | Peak of emission wavelength (nm) | Value of CIE chromaticity | | Afterglow time $B_{10\%}$ |
|---|---|---|---|---|---|
|  |  |  | x | y |  |
| Phosphor of the present invention $Y_2O_3$:Eu $BaF_2$ | 301 | 611* | 0.640 | 0.353 | 25 msec. |
| Conventional phosphor (I) $(Zn, Mg, Mn)_3(PO_4)_2$ | 100 | 628 | 0.650 | 0.330 | 120 msec. |
| Conventional phosphor (II) $Y_2O_3$:Eu | 334 | 611* | 0.642 | 0.351 | 1 msec. |

*indicates the main peak

Figure 2:
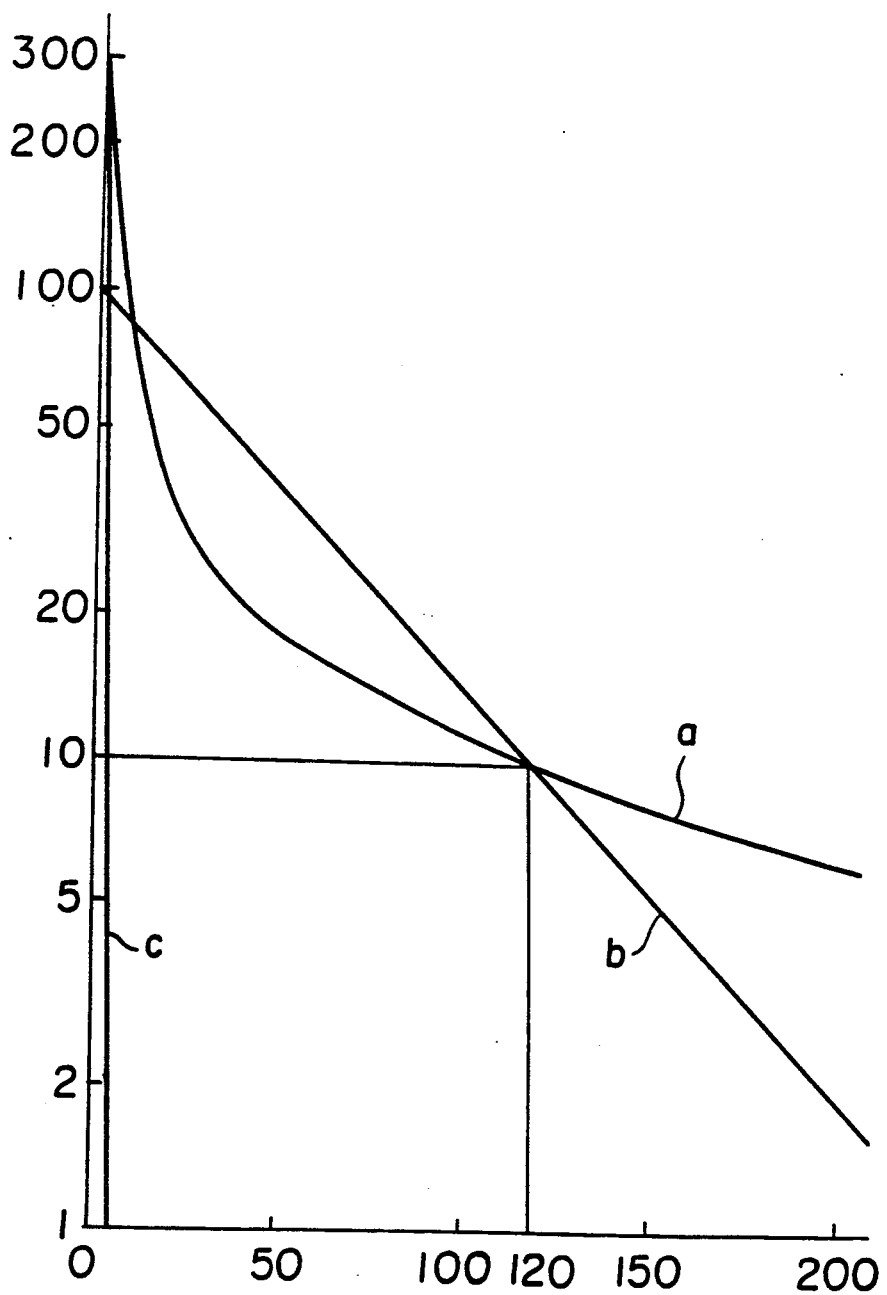
FIG. 2 is a graph showing the attenuation characteristics of afterglows of the same phosphors as in FIG. 1, but the emission luminance brightness of $(Zn,Mg)_3(PO_4)_2$:Mn under excitation is evaluated to be 100 and the emission luminance brightness of the other two phosphors is represented by values relative to the emission luminance brightness of $(Zn,Mg)_3(PO_4$:Mn.

Referring to the accompanying drawings, FIGS. 1 and 2 are graphs of the attenuation characteristics of afterglows after stopping of excitation, for comparison between the phosphors of the Examples of the present invention and conventional phosphors.

FIG. 1 is a graph showing the attenuation characteristics of the afterglows of the phosphors of the Examples of the present invention and of conventional phosphors $(Zn,Mg)_3(PO_4)_2$:Mn and $Y_2O_3$:Eu, wherein the attenuation is represented by the relative luminance brightness of the afterglow of each phosphor based on the emission luminance brightness of the phosphor under excitation being evaluated to be 100.

FIG. 2 is a graph showing the attenuation characteristics of afterglows of the same phosphors as in FIG. 1, but the emission luminance brightness of $(Zn,Mg)_3(PO_4)_2$:Mn under excitation is evaluated to be 100 and the emission luminance brightness of the other two phosphors is represented by values relative to the emission luminance brightness of $(Zn,Mg)_3(PO_4)_2$:Mn.

It is evident from Table 2 and the drawings that the phosphors of the Examples of the present invention are endowed long afterglows while maintaining high emission efficiencies. Further, for instance, the phosphor was mixed with a conventionally employed long afterglow-red phosphor, and the mixture was applied to form a phosphoresent screen by a well-known coating technique. The screen was then applied to a practical color cathode ray tube for display indication, whereby adequately satisfactory results were obtained with respect to the brightness, color tone, and prevention of flickering and deterioration. The present invention has a substantial industrial value in the future applications in this field.

As described in the foregoing, the present invention provides a phosphor for a cathode ray tube obtained by firing the tervalent europium-activated yttrium oxide of the formula $Y_2O_3$:Eu containing at least one member selected from the group consisting of barium fluoride and magnesium fluoride. Thus, a phosphor for a cathode ray tube endowed with long afterglow while maintaining high emission efficiency is obtainable.

What is claimed is:

1. A phosphor for a cathode ray tube obtained by a single stage firing at a temperature of 1300 to 1400° C. of a mixture comprising yttrium oxide and europium oxide in relative proportion to yield a tervalent europium-activated yttrium oxide of the formula $Y_2O_3$:Eu containing 2.0 to 5.0% by weight of magnesium fluoride.

* * * * *